(12) United States Patent
Katynski

(10) Patent No.: US 9,897,023 B2
(45) Date of Patent: Feb. 20, 2018

(54) SYSTEM AND METHOD FOR OPERATING A TRANSMISSION POWER TAKE OFF

(71) Applicant: Ford Global Technologies, LLC, Dearborn, MI (US)

(72) Inventor: Edward Katynski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 14/934,697

(22) Filed: Nov. 6, 2015

(65) Prior Publication Data

US 2017/0130662 A1  May 11, 2017

(51) Int. Cl.
| | |
|---|---|
| *F02D 41/02* | (2006.01) |
| *F02D 41/24* | (2006.01) |
| *F02D 41/00* | (2006.01) |
| *F02D 41/22* | (2006.01) |
| *F02D 41/26* | (2006.01) |
| *B60W 30/188* | (2012.01) |
| *F02D 31/00* | (2006.01) |

(52) U.S. Cl.
CPC ..... *F02D 41/0205* (2013.01); *B60W 30/1888* (2013.01); *F02D 31/001* (2013.01); *F02D 41/0002* (2013.01); *F02D 41/021* (2013.01); *F02D 41/22* (2013.01); *F02D 41/2406* (2013.01); *F02D 41/26* (2013.01); *F02D 31/002* (2013.01); *F02D 2200/503* (2013.01); *Y02T 10/40* (2013.01)

(58) Field of Classification Search
CPC ............... F02D 41/0205; F02D 41/021; F02D 41/2406; F02D 31/001
USPC ......................................................... 701/110
See application file for complete search history.

(56) References Cited

U.S. PATENT DOCUMENTS

| | | | |
|---|---|---|---|
| 8,834,318 B2 | 9/2014 | Sujan et al. | |
| 2002/0010534 A1* | 1/2002 | Goodnight | ............ B60W 10/06 701/54 |
| 2005/0239598 A1* | 10/2005 | Bauerle | .................. B60W 10/04 477/111 |
| 2007/0006572 A1* | 1/2007 | Yu | ........................... F01N 3/021 60/285 |
| 2012/0265389 A1 | 10/2012 | Bissontz | |
| 2015/0315766 A1* | 11/2015 | Take | ................... F02D 41/0205 701/22 |

* cited by examiner

*Primary Examiner* — Mahmoud Gimie
(74) *Attorney, Agent, or Firm* — Julia Voutyras; McCoy Russell LLP

(57) ABSTRACT

Methods and systems for operating a vehicle powertrain that includes an engine and a transmission including a power take off output are presented. In one non-limiting example, engine speed may be adjusted responsive to a level of a signal input to a controller. The controller may select an operating mode responsive to the level of the signal input to the controller.

20 Claims, 7 Drawing Sheets

SYSTEM AND METHOD FOR OPERATING A TRANSMISSION POWER TAKE OFF

BACKGROUND/SUMMARY

A transmission may include a power take off (PTO) output to provide engine torque to devices that are external to a vehicle powertrain. An internal combustion engine may input torque to the transmission and the transmission may distribute the engine torque to vehicle wheels and/or the external device via the power take off output. In some examples, the external device may be included within the vehicle that incorporates the engine and the transmission. For example, the external device may be a hydraulic pump for supplying hydraulic oil to a cylinder that operates a compactor or a bed lift. Alternatively, the external device may be a log splitter or another device that is not part of the vehicle. In some examples, the external device may be provided by the vehicle manufacturer. Alternatively, the external device may be supplied by a vehicle system integrator.

In addition to a power take off, a vehicle may supply electrical power to operate one or more electrical loads such as, but not limited to, medical equipment, lights, and communications equipment. The electrical power may be supplied via an alternator that is driven by the engine. Nevertheless, if power consumed by the electrical loads is greater than alternator power output, current for operating the electrical loads may be provided by the vehicle battery. Consequently, charge may flow from the battery to the electrical load, thereby lowering battery charge more than is desired. One way to reduce the possibility of lowering battery charge is to provide a battery charge protection mode so that engine speed may be increased to increase alternator power output. However, adding a battery protection mode in a vehicle that includes a PTO may increase an actual total number of controller inputs and outputs to a number that is greater than a controller supports. Therefore, it would be desirable to provide PTO and battery charge protection within a single controller using few inputs and outputs while providing a desired level of functionality.

The inventors herein have recognized the above-mentioned issues and have developed a vehicle system, comprising: a controller including executable instructions stored in non-transitory memory to adjust speed of an engine in response to a signal level applied to an input of the controller, the input having a full scale range, the full scale range divided into a plurality of subranges, the plurality of subranges including a power take off subrange and a battery charge protection subrange.

By dividing a full scale range of an input of a controller into a plurality of subranges, it may be possible to provide the technical result of providing a power take off mode and a battery charge protection mode based on a level of a single signal at the controller input. Consequently, a single input may be the basis for commanding and operating the vehicle powertrain. In one example, an input range of a controller voltage or current input may be divided into a plurality of subranges. Each of the plurality of subranges provides different data than each of the other subranges of the voltage or current input. The vehicle powertrain may be operated based on the subrange the signal is within.

For example, a controller voltage input may have a full scale range from 0-5 volts. A first subrange may be provided for signals that are over 4.9 volts and that are applied to the controller voltage input. A second subrange may be provided for signals less than 4.9 volts and greater than 0.5 volts. A third subrange may be provided for signals less than 0.5 volts and greater than 0.3 volts. A fourth subrange may be provided for signals less than 0.3 volts and greater than 0.1 volts. A fifth subrange may be provided or signals less than 0.1 volts. Each of the five subranges correspond to a different powertrain operating mode.

The present description may provide several advantages. In particular, the approach may reduce a number of controller inputs used to provide a desired actual total number of powertrain operating modes. Further, the approach may provide subranges that reduce the possibility of inadvertently entering an undesired powertrain operating mode. Additionally, the approach may provide a simply way to interface between components provided by different manufacturers.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
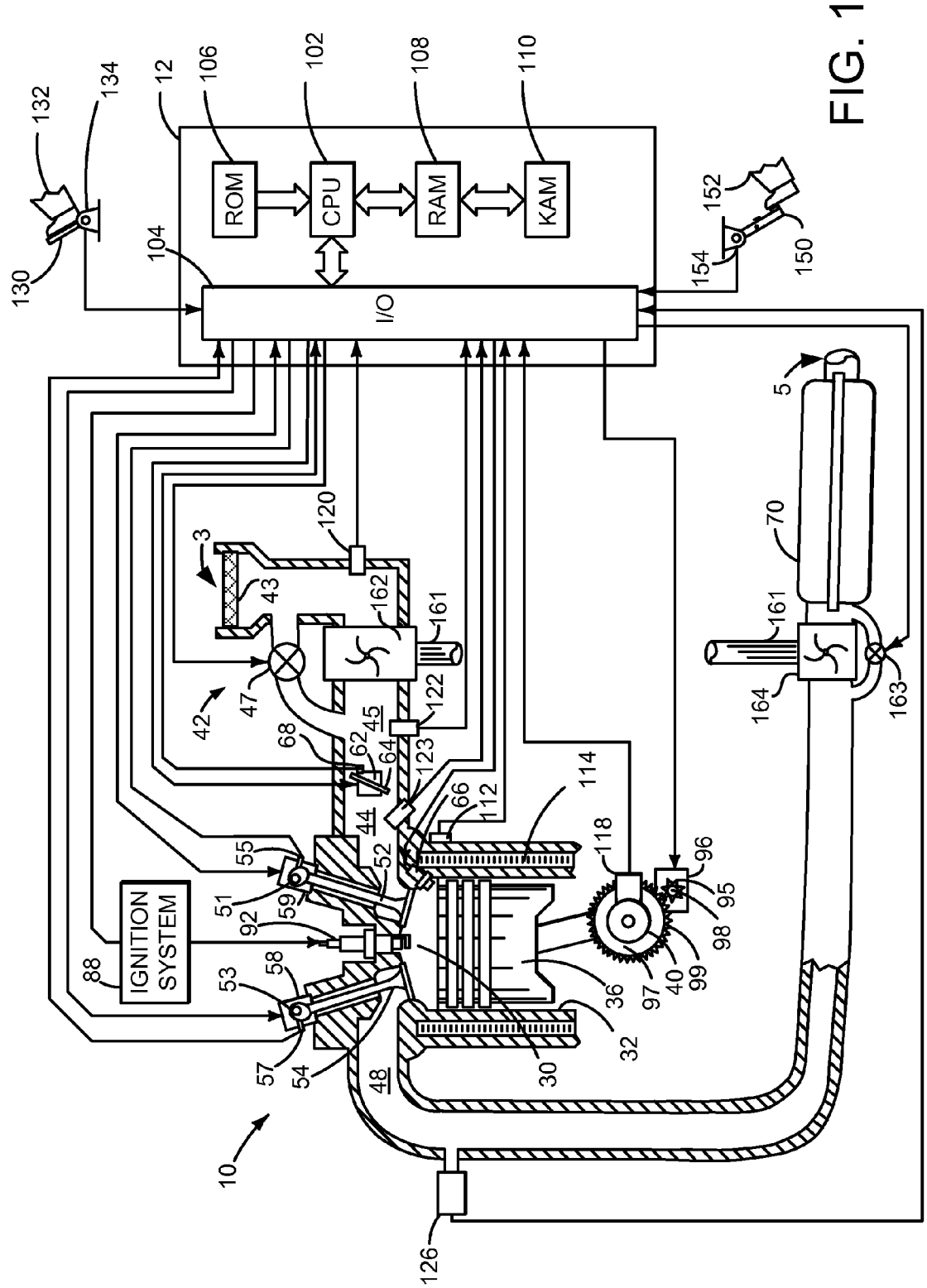
FIG. 1 shows a schematic depiction of an engine.
Figure 2:
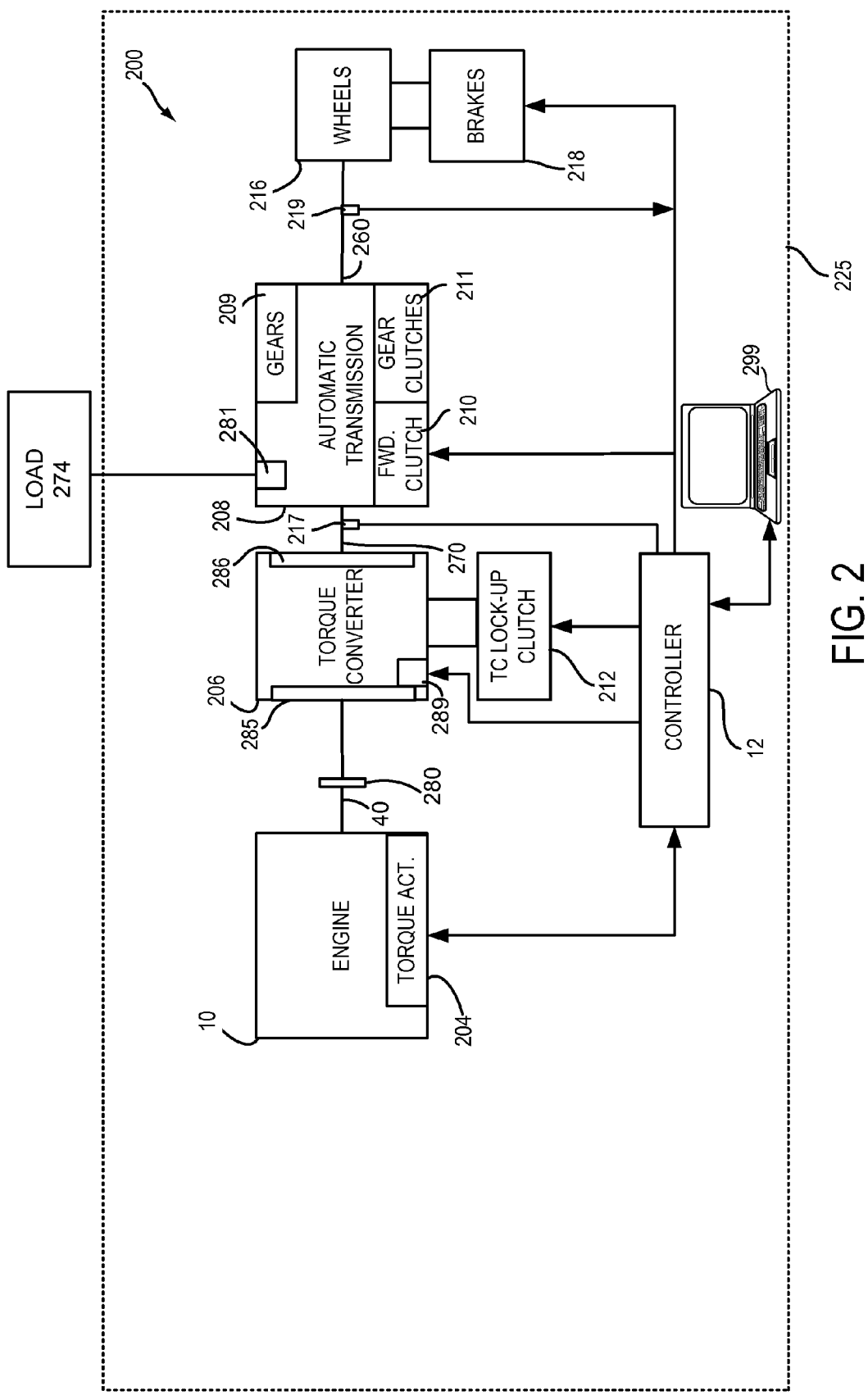
FIG. 2 shows a schematic depiction of an example vehicle powertrain including an engine.
Figure 3A:
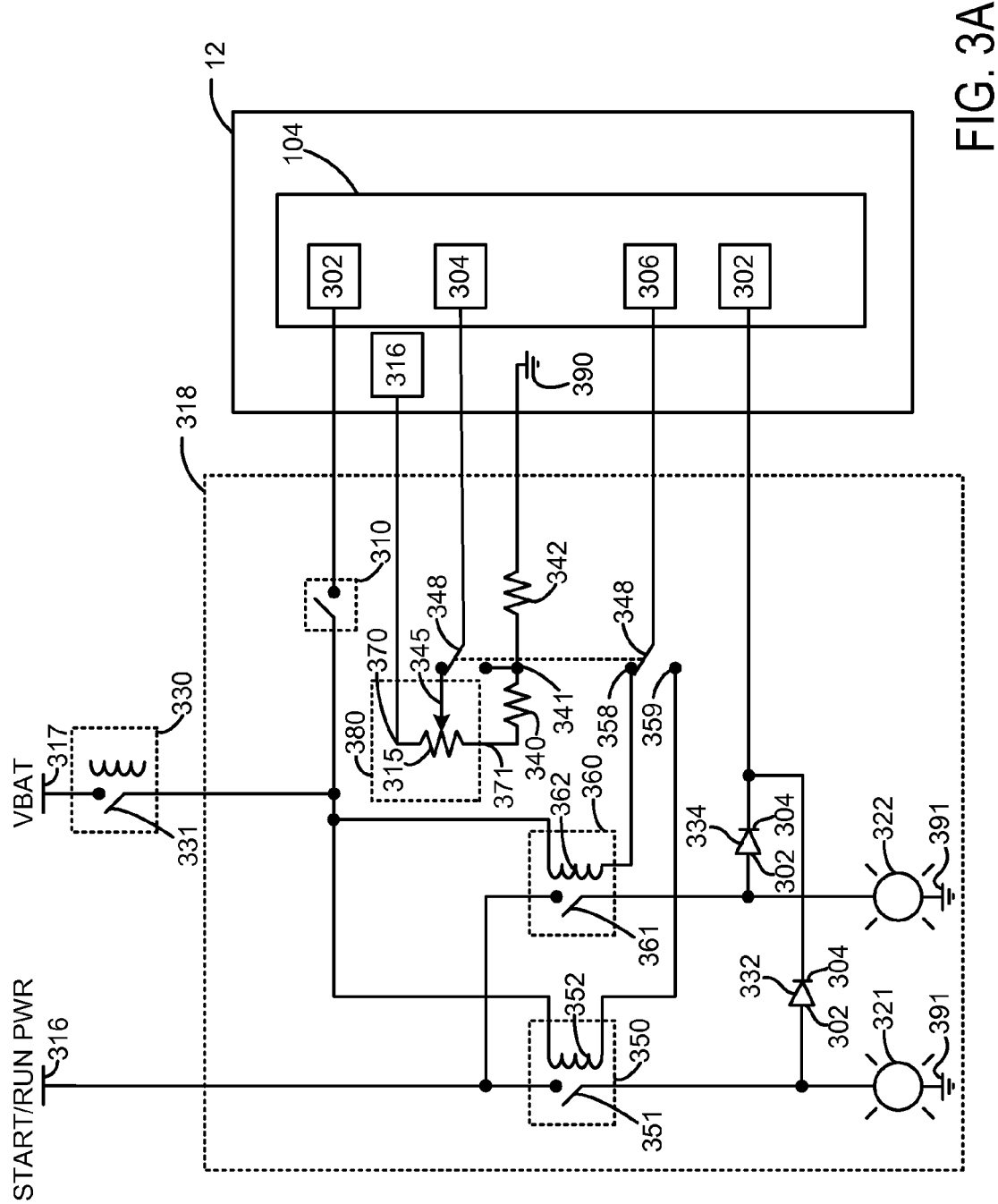
FIGS. 3A-3C show example schematics for interfacing a vehicle controller to ancillary devices.
Figure 3B:
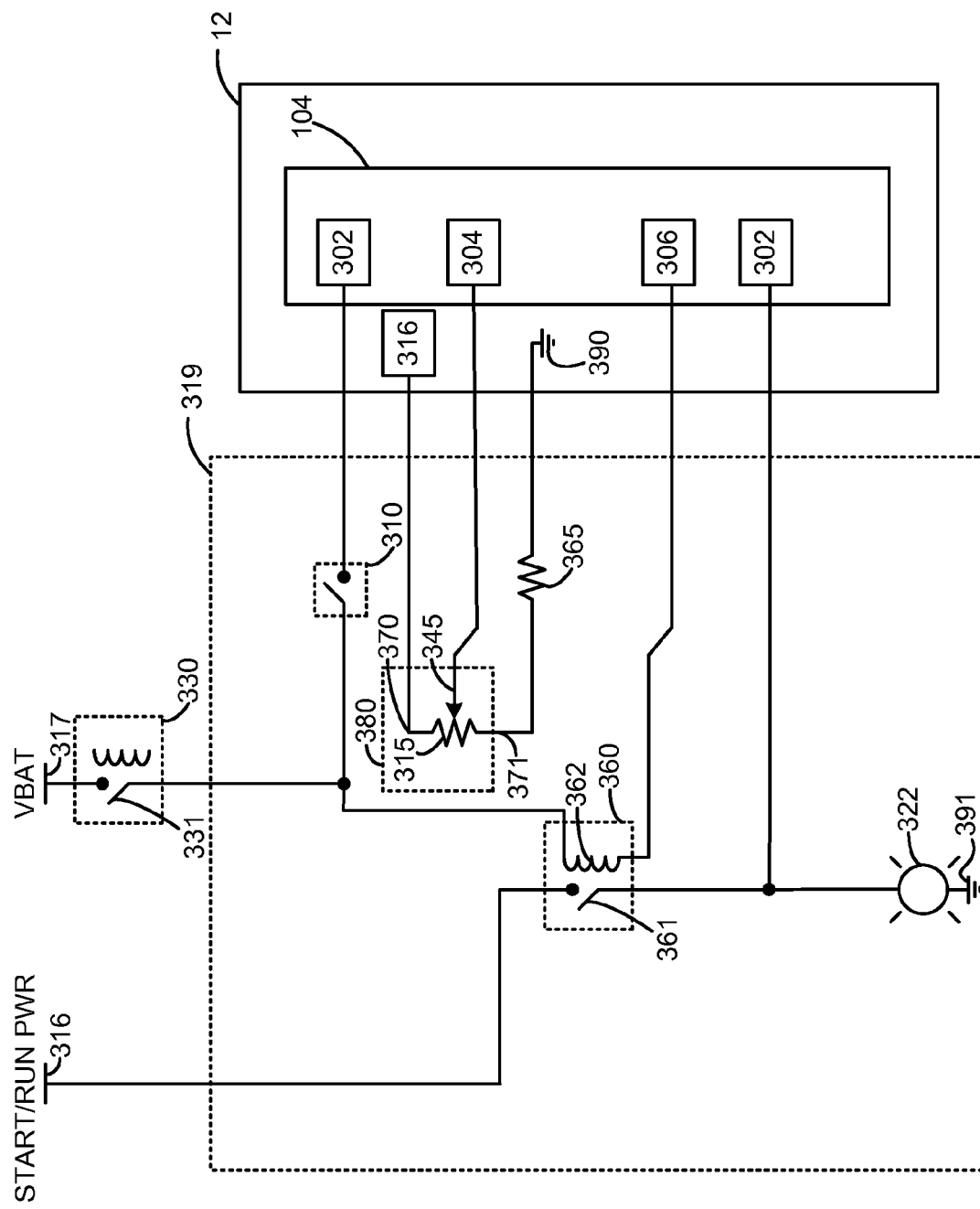
Figure 3C:
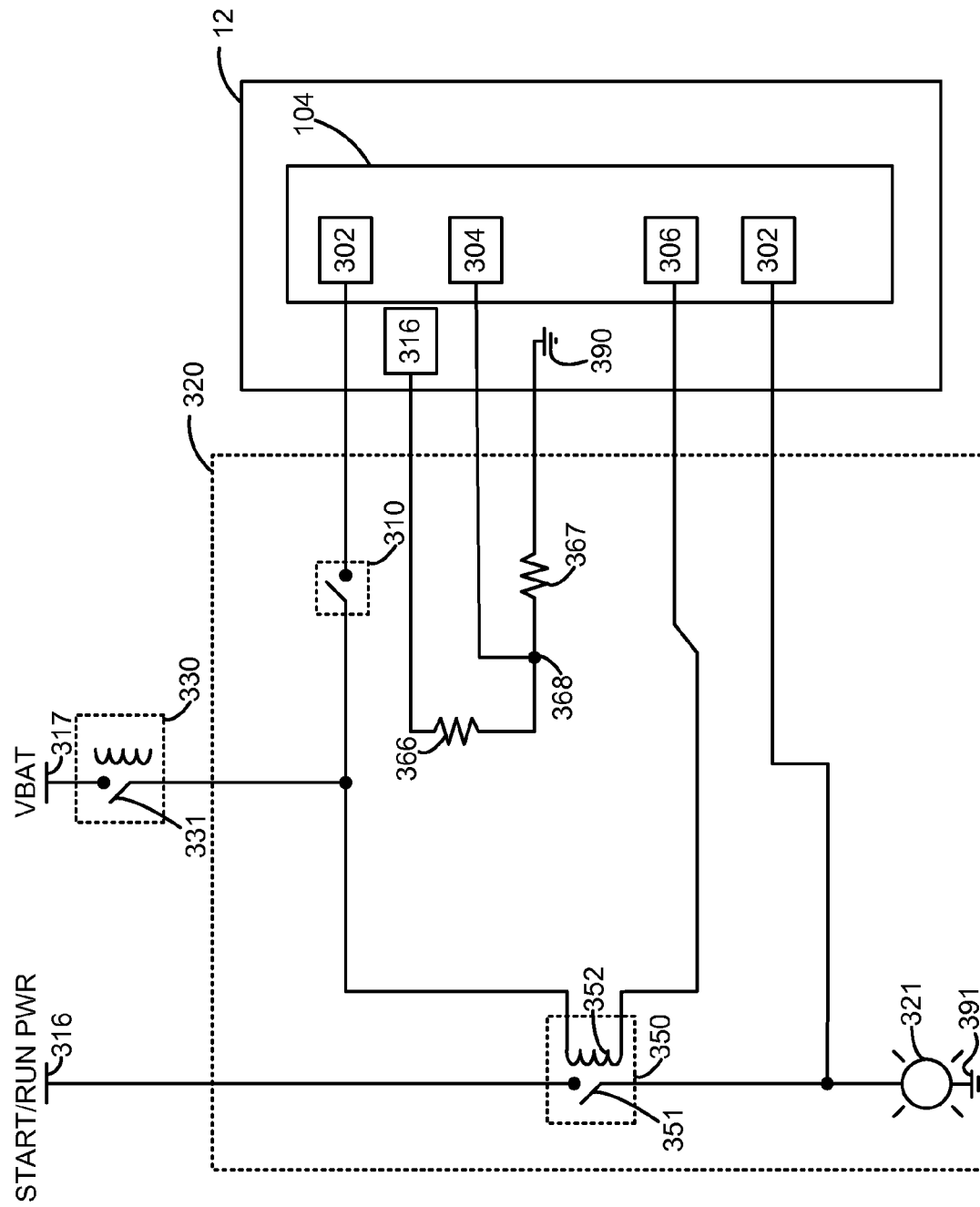
Figure 4:
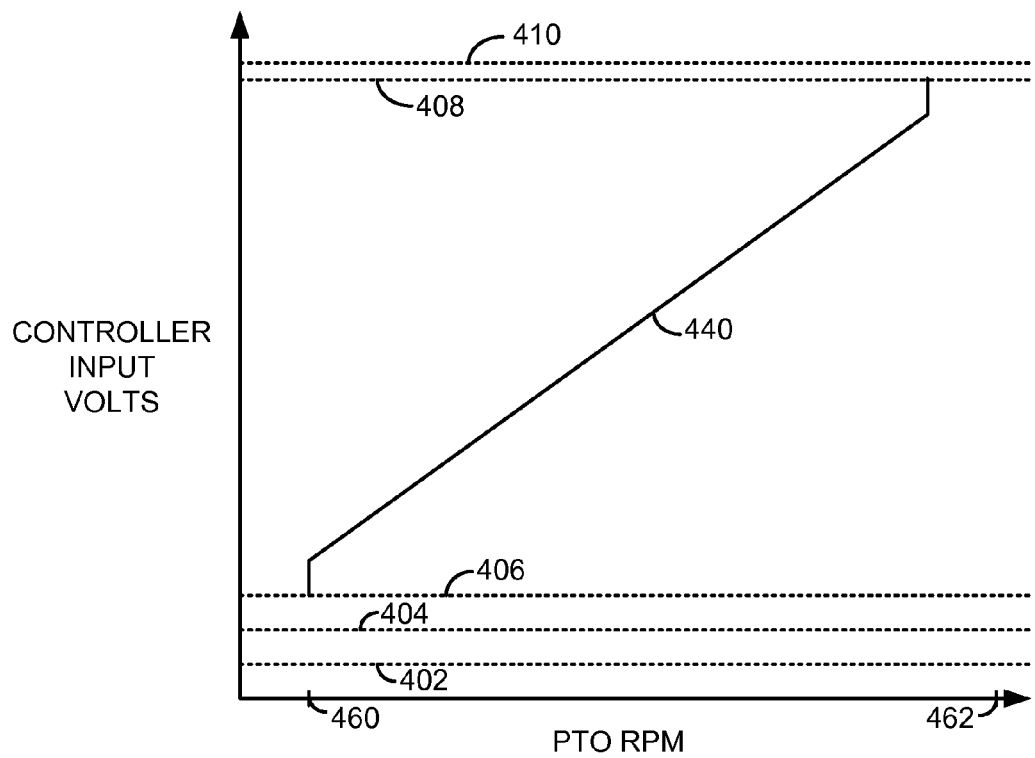
FIG. 4 shows an example transfer function for a controller input.

The present description is related to operating a vehicle powertrain that includes an engine that is coupled to a transmission that includes a power take off output. The power take off output supplies engine torque to an external device (e.g., an engine torque consumer) that does not supply positive torque to the transmission. The external device may be included in or apart from the vehicle in which the transmission operates. The engine may be configured as is shown in FIG. 1. The engine of FIG. 1 may be incorporated into a vehicle powertrain as shown in FIG. 2, and the engine may be the only adjustable torque source in the powertrain as is shown in FIG. 2. The controller shown in FIGS. 1 and 2 may interface with ancillary devices as is shown in FIGS. 3A-3C. A full scale range of an input of a controller may be divided into a plurality of subranges as is shown in FIG. 4, and the subranges may be a basis for selecting a powertrain operating mode. The powertrain may operate according to the method shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5, which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a powertrain 200. The powertrain of FIG. 2 includes engine 10 shown in FIG. 1. Engine 10 includes one or more torque actuators 204 (e.g., a throttle, camshaft, fuel injector, etc.) Powertrain 200 may be powered by engine 10. Engine crankshaft 40 is shown coupled to dampener 280, and dampener 280 is shown coupled to impeller 285 of torque converter 206. Torque converter impeller 285 is mechanically coupled to transmission pump 289. Transmission mechanically driven pump 289 supplies pressurized transmission fluid to transmission clutches 210 and 211. Torque converter 206 also includes a turbine 286 coupled to transmission input shaft 270. Transmission input shaft 270 mechanically couples torque converter 206 to automatic transmission 208 and its speed is monitored via speed sensor 217. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches 211 and forward clutch 210 to engage or disengage gears 209 (e.g., reverse and gears 1-10). The gear clutches 211 (e.g., 1-10) and the forward clutch 210 may be selectively engaged to propel a vehicle. Transmission 208 also includes a power take off output shaft 281 for supplying engine torque to a mechanical or electrical load 274 external to the powertrain. Power take off output shaft 281 rotates when activated and does not rotate when it is deactivated. In this example, load 274 is external to the vehicle 225, but in other examples, load 274 may be included in vehicle 225. Transmission 208 is configured such that one gear of gears 209 may be engaged by applying two or more of clutches 211. In other words, a gear may be positively engaged when two or more of clutches 211 are closed. Further, transmission 208 may enter a neutral state where input shaft 270 is not engaged with or coupled to output shaft 260 when one or more of clutches 211 is open but while one or more of clutches 211 are closed. Power take off output shaft 281 may supply engine torque to load 274 when transmission 208 is neutral or in gear. Torque output from the automatic transmission 208 may be relayed to wheels 216 to propel the vehicle via output shaft 260. Speed of output shaft 260 is monitored via speed sensor 219. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Thus, in this example, engine 10 is the only adjustable torque source that may provide positive torque to powertrain 200. Torque flows from engine 10 to transmission 208 before being applied to wheels 216. Thus, engine 10 is upstream of torque converter 206, transmission 208, and wheels 216 in a direction of torque flow.

Controller 12 may be configured to receive inputs from engine 10, as shown in more detail in FIG. 1, and accordingly control a torque output of the engine and/or operation of the torque converter, transmission, clutches, and/or brakes. Further, controller 12 may receive driver input from man/machine interface 299. In some examples, man/machine interface 299 may provide powertrain information and indications to a driver. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Referring now to FIG. 3A, an example schematic for interfacing a vehicle controller to an ancillary device is shown. In this example, the ancillary device is an external power take off and battery charge protection control system 318.

Power take off/battery charge protection control system 318 is supplied electrical power from start/run power source 316 and vehicle battery 317. Start/run power may be switched so that power may be selectively applied to power take off/battery charge protection control system 318. Vehicle battery voltage may be selectively applied to power take off/battery charge protection control system 318 via power control relay 330. Switch 331 may be closed to supply battery power to power take off/battery charge protection control system 318 in response to a driver activating the vehicle via an ignition key or switch (not shown).

An operator may request that the power take off output be activated to deliver engine torque to an external device or request for battery charge protection via the operator closing switch 310. If an operator closes switch 310, battery voltage is applied to digital input 302 in controller inputs/output 104 of controller 12.

Power take off and battery charge protection control system 318 includes potentiometer 380, which includes wiper 345, terminal 370, and terminal 371. The reference voltage from voltage regulator 316 is applied to terminal 370 and signal return voltage is applied to terminal 371 so that the potential difference between voltage regulator 316 and signal return 390 is equal to the output of voltage regulator 316. A voltage exits between resistor 340 and resistor 342 at node 341 that represents the voltage drop across resistor 342. The voltage drop across potentiometer resistor 315 is equal to the reference voltage output by regulator 316 minus the voltage drop across resistor 340 and resistor 342. The voltage drop across resistor 342 is equal to the current flowing through resistor 342 (e.g., the reference voltage divided by the resistance of resistors 342 and 340 plus the resistance of potentiometer resistor 315) multiplied by the resistance of resistor 342. The voltage drop across potentiometer resistor 315 is equal to the reference voltage minus the voltage drop across resistors 340 and 342. Therefore, wiper 345 may be adjusted to provide a voltage between the reference voltage and the voltage drop across resistors 340 and 342. For example, if the reference voltage is 5 volts and the voltage drop across resistor 342 is 0.1 volts and the voltage drop across resistor 340 is 0.4 volts, the position of wiper 345 may be adjusted to provide between 0.5 volts and 5 volts at analog voltage input 304 during conditions where the system of FIG. 3A is operating as expected. In one example, the potentiometer resistance and resistance of resistors 340 and 342 are sized so that a voltage range available at wiper 345 corresponds to the voltage range of the power take off subrange and the voltage range of the high out of scale subrange. Further, the voltage at node 341 corresponds to the voltage range of the battery charge protection subrange. The voltage at node 341 is a fixed value.

First resistor 340 and second resistor 342 are in series with resistor 315. Double pole—double switch 348 is electrically coupled to wiper 345, node 341, and analog voltage input 304. In a first position as is shown (e.g., stationary elevated idle control position with PTO activated), switch 348 is in direct electrical communication (e.g., no intervening electrical components) with wiper 345. A voltage signal input to analog voltage input 304 via switch 348 is adjustable via adjusting a position of wiper 345. The voltage input to analog voltage input 304 when double pole—double switch 348 is in the first position may be a power take off subrange of a full scale range of analog voltage input 304. In a second position not shown (e.g., battery charge protection mode select position), switch 348 is in direct electrical communication with node 341. A voltage signal input to analog voltage input 304 via switch 348 when switch 348 is in direct electrical communication with node 341 is fixed and based on the voltage output from reference voltage regulator 316, resistance of resistor 315, resistance of first resistor 340, and resistance of second resistor 342 as previously discussed. The voltage input to analog voltage input 304 when double pole—double switch 348 is in the second position may be a battery charge protection subrange of a full scale range of analog voltage input 304.

If a voltage signal input to analog voltage input 304 is within a range defined as a power take off subrange for a predetermined amount of time after a request to activate the power take off output or request for battery charge protection, the power take off output is activated to deliver engine torque to the external load and engine speed is adjusted in response to the signal voltage at analog voltage input 304. If a voltage input to analog voltage input 304 is within a range defined as a battery charge protection subrange for a predetermined amount of time after a request to activate the power take off output or request for battery charge protection, the engine speed is increased in response to battery voltage being less than a threshold.

Double pole—double switch 348 also is used to control relay 360 and relay 350. Relay 360 is activated to provide voltage to lamp 322 to indicate power take off mode is activated. Relay 350 is activated to provide voltage to lamp 321 to indicate battery charge protection mode is activated. In some examples, a man/machine interface may be substituted for lamps 321 and 322 to provide an indication of power take off operating state and battery charge protection state to an operator.

In a first position as is shown (e.g., stationary elevated idle control position), switch 348 is in direct electrical communication (e.g., no intervening electrical components) with terminal 358 of relay 360. Relay 360 may activated when digital output 306 is asserted. Digital output 306 provides a path to ground 391 when it is asserted or activated. Switch 361 closes to provide start/run power to lamp 322 when coil 362 of relay 360 is activated by activating digital output 306. Start/run power is also delivered digital input 302 when switch 361 is in a closed position, and it provides positive verification that relay 360 is in a closed state. Diode 334 includes anode 302 and cathode 304, which are biased to allow current flow from start/run power source to digital input 302, but not from diode 332 to lamp 322.

In a second position (not shown) (e.g., a battery charge protection position), switch 348 is in direct electrical communication (e.g., no intervening electrical components) with terminal 359 of relay 350. Relay 350 may activated when digital output 306 is asserted. Digital output 306 provides a path to ground 391 when it is asserted or activated. Switch 351 closes to provide start/run power to lamp 321 when coil 352 of relay 350 is activated by activating digital output 306. Start/run power is also delivered digital input 302 when switch 351 is in a closed position, and it provides positive verification that relay 350 is in a closed state. Diode 332 includes anode 302 and cathode 304, which are biased to allow current flow from start/run power source to digital input 302, but not from diode 334 to lamp 321.

If controller 12 interprets level of a signal input to analog voltage input 304 as being in a dead-band subrange, a low out of scale subrange, or a high out of scale subrange, the power take off and the battery charge protection modes are not activated so that the power take off output shaft does not rotate. Further, engine idle speed is not adjusted based on signals from external power take off and battery charge protection control system 318. This may be referred to as lock out mode.

Thus, FIG. 3A show an example schematic for interfacing a vehicle controller to an ancillary device to provide both battery charge protection mode and power take off mode. Both modes are provided via a same group of inputs and outputs of controller 12.

Referring now to FIG. 3B, an example schematic for interfacing the same vehicle controller to an ancillary device to provide only power take off mode without battery charge protection is shown. The system of FIG. 3B includes many components that are the same as the components shown in FIG. 3A. Components or elements in FIG. 3B that are common with components in FIG. 3A are labeled with the same numeric labels. Further, the description of elements that are the same between FIGS. 3A and 3B is omitted for the sake of brevity. Nevertheless, the components or elements in FIG. 3B that have the same numeric identifies as the elements in FIG. 3A operate as described in FIG. 3A. Differences between the systems of FIG. 3A and FIG. 3B are described.

Power take off control system 319 includes potentiometer 380, which includes wiper 345, terminal 370, and terminal 371. Wiper 345 is in direct electrical communication with analog voltage input 304. The reference voltage from voltage regulator 316 is applied to terminal 370 and signal return voltage is applied to terminal 371 so that the potential difference between voltage regulator 316 and signal return 390 is equal to the output of voltage regulator 316. A voltage exits between terminal 371 and signal return 390 that represents the voltage drop across resistor 365. The voltage drop across potentiometer resistor 315 is equal to the reference voltage output by regulator 316 minus the voltage drop across resistor 365. The voltage drop across resistor 365 is equal to the current flowing through resistor 365 (e.g., the reference voltage divided by the resistance of resistor 365 plus the resistance of potentiometer resistor 315) multiplied by the resistance of resistor 365. The voltage drop across potentiometer resistor 315 is equal to the reference voltage minus the voltage drop across resistor 365. Therefore, wiper 345 may be adjusted to provide a voltage between the reference voltage and the voltage drop across resistor 365. For example, if the reference voltage is 5 volts and the voltage drop across resistor 365 is 0.5 volts, the position of wiper 345 may be adjusted to provide between 0.5 volts and 5 volts at analog voltage input 304 during conditions where the system of FIG. 3B is operating as expected. In one example, the potentiometer resistance and resistance of resistor 365 are sized so that a voltage range available at wiper 345 corresponds to the voltage range of the power take off subrange and the voltage range of the high out of scale subrange.

Digital output 306 is shown in direct electrical communication with coil 362 of relay 360. Digital output 306 may be activated after switch 310 is closed by an operator and a voltage in the power take of subrange is applied to analog input 304 via wiper 345. Relay 360 closes switch 361 when digital output 306 is asserted and start/run power is supplied to relay 360. Start/run power activates lamp 322 when switch 361 is in a closed state.

In this way, the hardware of system 319 may provide signals for operating only with power take off mode functionality and without a battery charge protection mode functionality when the same inputs, outputs, and executable code or method of controller 12 are used in combination with the system 319 as are used with the hardware of system 318. Thus, controller 12 and its associated code may be common when applied to system 318 and system 319.

Referring now to FIG. 3C, an example schematic for interfacing the same vehicle controller to an ancillary device to provide only battery charge protection without power take off mode is shown. The system of FIG. 3C includes many components that are the same as the components shown in FIG. 3A. Components or elements in FIG. 3C that are common with components in FIG. 3A are labeled with the same numeric labels. Further, the description of elements that are the same between FIGS. 3A and 3C is omitted for the sake of brevity. Nevertheless, the components or elements in FIG. 3C that have the same numeric identifies as the elements in FIG. 3A operate as described in FIG. 3A. Differences between the systems of FIG. 3A and FIG. 3C are described.

Power take off control system 320 includes resistor 366 and resistor 367. The reference voltage from voltage regulator 316 is applied to resistor 366 and signal return voltage is applied to resistor 367 so that the potential difference across resistor 366 and resistor 367 is equal to the output of voltage regulator 316. A voltage exits between resistor 366 and resistor 367 and it represents the voltage drop across resistor 367. In particular, the voltage drop across resistor 367 is equal to the reference voltage output by regulator 316 minus the voltage drop across resistor 366. The voltage drop across resistor 367 is equal to the current flowing through resistors 366 and 367 (e.g., the reference voltage divided by the resistance of resistor 366 plus the resistance of resistor 367) multiplied by the resistance of resistor 367. The voltage drop across resistor 366 is equal to the reference voltage minus the voltage drop across resistor 367. In one example, the resistance of resistor 366 and resistance of resistor 367 are sized so that a voltage range between resistor 366 and resistor 367 corresponds to the voltage range of the battery charge protection subrange.

Digital output 306 is shown in direct electrical communication with coil 352 of relay 350. Digital output 306 may be activated after switch 310 is closed by an operator and a voltage in the power take of subrange is from node 368 is applied to analog input 304. Relay 350 closes switch 351 when digital output 306 is asserted and start/run power is supplied to relay 350. Start/run power activates lamp 321 when switch 351 is in a closed state.

In this way, the hardware of system 320 may provide a signal for operating only in battery charge protection mode functionality without power take off mode functionality when the same inputs, outputs, and executable code or method of controller 12 are used in combination with the system 320 as are used with the hardware of system 318. Thus, controller 12 and its associated code may be common when applied to system 318 and system 320.

Thus, the systems of FIGS. 1-3C provide for a vehicle system, comprising: a controller including executable instructions stored in non-transitory memory to adjust speed of an engine in response to a signal level applied to an input of the controller, the input having a full scale range, the full scale range divided into a plurality of subranges, the plurality of subranges including a power take off subrange and a battery charge protection subrange. The vehicle system includes where the signal level is a current level. The vehicle system includes where the signal level is a voltage level.

In some examples, the vehicle system includes where the plurality of subranges include a dead band subrange. The vehicle system includes where the plurality of subranges includes a low out of scale subrange. The vehicle system includes where the plurality of subranges includes a high out of scale subrange. The vehicle system further comprises additional instructions for increasing speed of an engine in response to the signal level being in the battery charge protection subrange. The vehicle system further comprises additional instructions for adjusting engine speed to follow the signal level when the signal level is in the power take off subrange.

Additionally, the system of FIGS. 1-3C provide for a vehicle system, comprising: a potentiometer; first and second resistors electrically coupled in series; a switch selectively electrically coupled to the potentiometer and the first and second resistors; and a controller including executable instructions stored in non-transitory memory to adjust speed of an engine in response to a signal level applied to an input of the controller, the input having a full scale range, the input to the controller electrically coupled to the switch.

In some examples, the system further comprises additional instructions to divide the full scale range into a plurality of subranges, the plurality of subranges including a power take off subrange and a battery charge protection subrange. The vehicle system further comprises additional instructions to determine a vehicle operating mode in response to the signal level applied to the input of the controller. The vehicle system includes where the vehicle operating mode is a power take off mode. The vehicle system includes where the vehicle operating mode is a battery charge protection mode. In the battery charge protection mode engine speed may be increased to increase alternator output, thereby increasing battery charge. The vehicle system includes where engine speed is adjusted responsive to a battery voltage in the battery charge protection mode. The vehicle system further comprises additional instructions to activate a relay in response to the signal level applied to the input of the controller, the relay controlling an indication of an operating mode of a vehicle.

Referring now to FIG. 4, a plot of an example full scale range and subranges for a controller input are shown. The controller input may represent an analog voltage input 304 shown in FIG. 3, which includes an analog to digital converter. The vertical axis represents controller input voltage and the horizontal axis represents power take off (PTO) revolutions per minute (RPM).

The power take off speed at 460 represents a lower power take off output speed (e.g., 500 RPM). The power take off speed 462 represents a higher power take off output speed (e.g., 2400 RPM).

The voltage range between the horizontal axis (e.g., zero volts) and voltage at the level of line 410 represents full scale analog input voltage (e.g., 5 volts). The voltage range from the horizontal axis to line 410 is divided or broken into five subranges.

A first subrange is between the horizontal axis and line 402. In one example, this subrange (e.g., between zero and 0.1 volts) is a low out of scale subrange. This range may indicate system degradation where the analog voltage input voltage is lower than expected. A voltage at the controller analog input in this range directs the controller to enter lockout mode where engine idle speed is not adjusted for power take off or battery charge protection.

A second subrange is between the line 402 and line 404. In one example, this subrange (e.g., between 0.1 volts and 0.3 volts) is a battery charge protection subrange. A voltage at the controller analog input in this range for a predetermined amount of time may indicate to the controller that battery charge protection is being requested by the operator or user. The engine speed is not directly based on the voltage at the controller analog input when the voltage applied to the analog input is in this range.

A third subrange is between the line 404 and line 406. In one example, this subrange (e.g., between 0.3 volts and 0.5 volts) is a dead-band subrange. A voltage at the controller analog input in this range may indicate to the controller that system degradation is present. A voltage at the controller analog input in this range directs the controller to enter lockout mode where engine idle speed is not adjusted for power take off or battery charge protection.

A fourth subrange is between the line 406 and line 408. In one example, this subrange (e.g., between 0.5 volts and 4.9 volts) is a power take off subrange. A voltage at the controller analog input in this range for a predetermined amount of time may indicate to the controller that the operator or user is requesting power take off mode. The power take off output shaft may begin to rotate when the controller analog input senses a voltage in this range. Further, engine speed is adjusted in response to a level of voltage applied to the controller analog input based on curve 440. In the central portion of curve 440, power take off RPM may be increased via increasing engine RPM proportionately with the voltage at the controller's analog input. In this way, voltage in the subrange between 406 and 408 may be the basis for entering power take off mode and adjusting speed of the power take off output shaft.

A fifth subrange is between the line 408 and line 410. In one example, this subrange (e.g., between 4.9 volts and 5 volts) is a high out of scale subrange. A voltage at the controller analog input in this range may indicate to the controller that system degradation is present. A voltage at the controller analog input in this range directs the controller to enter lockout mode where engine idle speed is not adjusted for power take off or battery charge protection.

In some examples, curve 440 may be described as a transfer function that relates controller analog input voltage to power take off speed. Engine speed may be adjusted to provide the desired power take off speed via adjusting a position of a throttle, camshaft, valve timing, or other engine torque actuator.

Figure 5:
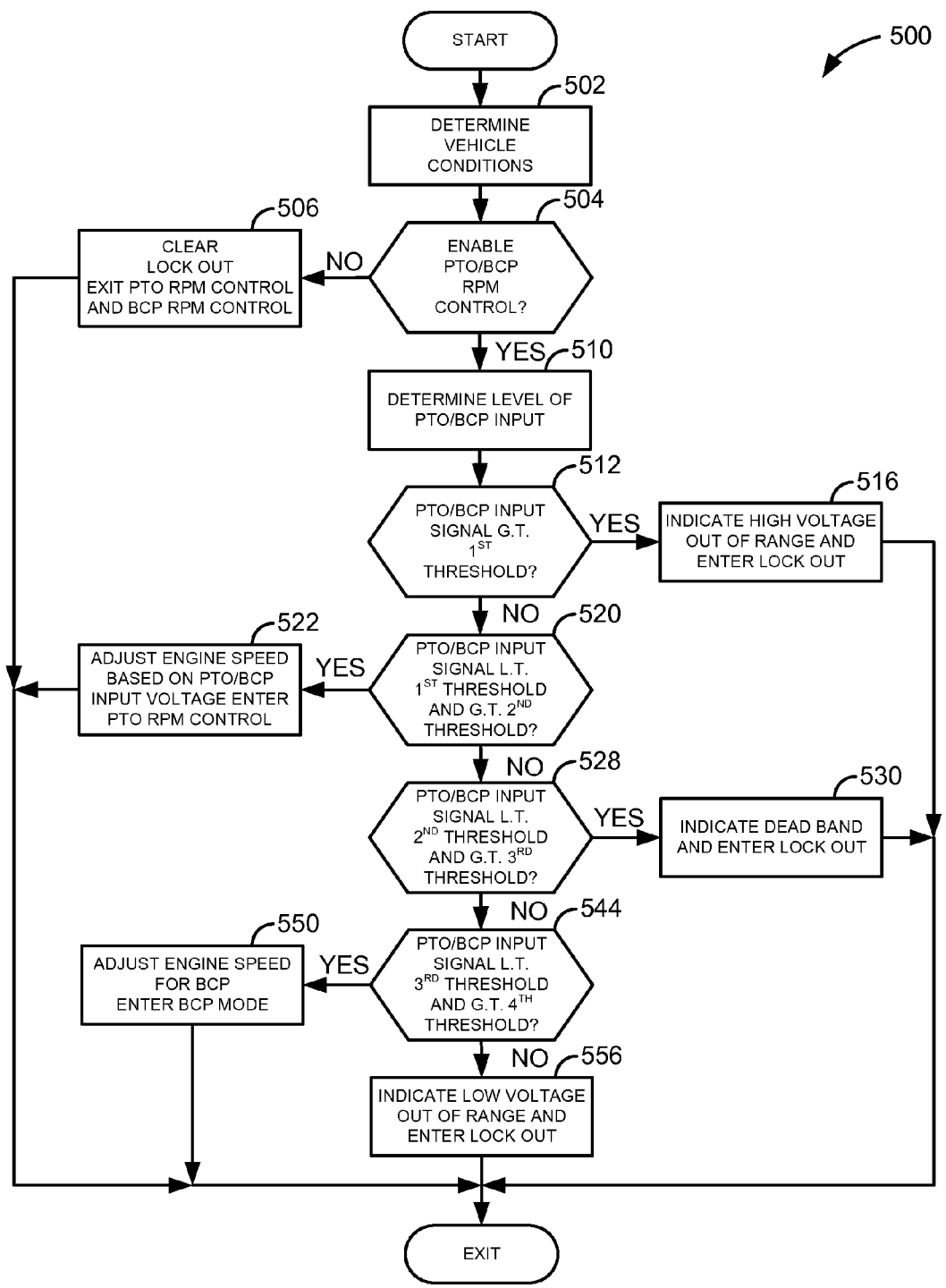
FIG. 5 shows a flowchart of an example method for operating the powertrain with a transmission that includes a power take off device.

Referring now to FIG. 5, a method for operating a vehicle powertrain that may include a power take off is shown. The method of FIG. 5 may be incorporated into the system of FIGS. 1-3C as executable instructions stored in controller non-transitory memory. Further, portions of the method of FIG. 5 may be actions taken by controller 12 in the physical world to transform vehicle operating states via one or more actuators and/or sensors.

At 502, method 500 determines vehicle conditions. Vehicle conditions may include but are not limited to power take off request status, desired power take off speed, engine speed, selected transmission gear, and ambient environmental conditions. Method 500 proceeds to 504 after determining vehicle conditions.

At 504, method 500 judges if a user has requested power take off or battery charge protection. In one example, a user may request power take off or battery charge protection via adjusting a position of a switch. Alternatively, a controller may make a power take off or battery charge protection request via setting a value of a bit in controller memory. Further, method 500 may also require other conditions to be met to determine if the system should provide power take off output or battery charge protection. For example, the vehicle may be required to be parked with a brake applied to enter battery charge protection mode or power take off mode. If method 500 judges that power take off or battery charge protection conditions are met, the answer is yes and method 500 proceeds to 510. Otherwise, the answer is no and method 500 proceeds to 506.

At 506, method 500 clears a bit in memory that indicates that system is in lock out mode (e.g., where power take off output is not provided and where battery charge protection is not provided). By clearing the bit in memory, it may be possible for the system to enter power take off mode or battery charge protection mode a next time an operator requests either mode. Further, the engine is returned to a base idle speed if idle speed is being elevated for power take off or battery charge protection. Further still, if power take off mode is active, the power take off output is deactivated and the power take off output ceases to rotate. Method 500 proceeds to exit after power take off mode and battery charge protection mode are exited.

At 510, method 500 determines a level of a signal that is used to determine what operating mode is being requested. In one example, the signal may be a voltage, and the voltage is read via an analog to digital converter. The signal may be received at a power take off/battery charge protection input to the controller. In other examples, the signal may be a current, a value of a variable in memory, or a value communicated to the system via a communications link (e.g., a controller area network). Method 500 determines the signal level via reading an analog to digital converter or via reading a value of a location in memory. Method 500 proceeds to 512 after the level of the signal is determined.

At 512, method 500 judges if the signal at the power take off/battery charge protection input signal level (e.g., voltage level) is greater than (G.T.) a first threshold level for a predetermined amount of time. In one example, the first threshold level is 4.9 volts where the full scale input range is 5 volts. Voltage levels greater than 4.9 are in a first subrange of the full scale input range. If method 500 judges that the signal is greater than the first threshold level, the answer is yes and method 500 proceeds to 516. Otherwise, the answer is no and method 500 proceeds to 520.

At 516, method 500 provides an indication that the signal is in a high out of scale subrange. The indication may be provided via a lamp or a human/machine interface. Also, a bit in memory is set to a value of one to enter lock out mode. In lock out mode, battery charge protection is not provided nor is power take off. The engine is operated at a base idle speed when the engine is idling. Method 500 proceeds to exit after entering lock out mode.

At 520, method 500 judges if the signal at the power take off/battery charge protection input signal level (e.g., voltage level) is less than (L.T.) the first threshold level and greater than (G.T.) a second threshold level for a predetermined amount of time. In one example, the second threshold level is 0.5 volts. Voltage levels less than 4.9 and greater than 0.5 volts are in a second subrange of the full scale input range. If method 500 judges that the signal is less than the first threshold level and greater than the second threshold level, the answer is yes and method 500 proceeds to 522. Otherwise, the answer is no and method 500 proceeds to 528.

At 522, method 500 provides an indication that the signal is in the power take off subrange. The indication may be provided via a lamp or a human/machine interface. Further, the power take off output is activated and it begins to rotate. Additionally, engine speed is adjusted to a value that is based on the level of the power take off/battery charge protection input. In one example, the engine speed is adjusted according to the relationship shown in FIG. 4. Method 500 proceeds to exit after power take off mode is activated and engine speed is adjusted based on the power take off/battery charge protection input signal level.

At 528, method 500 judges if the signal at the power take off/battery charge protection input signal level (e.g., voltage level) is less than (L.T.) the second threshold level and greater than (G.T.) a third threshold level for a predetermined amount of time. In one example, the third threshold level is 0.3 volts. Voltage levels less than 0.5 and greater than 0.3 volts are in a third subrange of the full scale input range. If method 500 judges that the signal is less than the second threshold level and greater than the third threshold level, the answer is yes and method 500 proceeds to 530. Otherwise, the answer is no and method 500 proceeds to 544.

At 530, method 500 provides an indication that the signal is in the dead band subrange. The indication may be provided via a lamp or a human/machine interface. Further, the system sets a bit in memory to a value of one and enters lock out mode. The engine is operated at base idle speed when the engine is idling. Method 500 proceeds to exit after entering lock out mode.

At 544, method 500 judges if the signal at the power take off/battery charge protection input signal level (e.g., voltage level) is less than (L.T.) the third threshold level and greater than (G.T.) a fourth threshold level for a predetermined amount of time. In one example, the fourth threshold level is 0.1 volts. Voltage levels less than 0.3 and greater than 0.1 volts are in a fourth subrange of the full scale input range. If method 500 judges that the signal is less than the third threshold level and greater than the fourth threshold level, the answer is yes and method 500 proceeds to 550. Otherwise, the answer is no and method 500 proceeds to 556.

At 550, method 500 provides an indication that the signal is in the battery charge protection subrange. The indication may be provided via a lamp or a human/machine interface. Additionally, engine speed is adjusted to a value that is based on battery voltage. In one example, the engine speed may increase up to a maximum battery charge protection speed (e.g., 1100 RPM) responsive to battery voltage. By adjusting engine speed responsive to battery voltage, method 500 may operate to maintain or increase battery charge, thereby protecting battery charge. Method 500 proceeds to exit after battery charge protection is activated and engine speed is adjusted based on battery voltage.

At 556, method 500 provides an indication that the signal is in a low out of scale subrange. The indication may be provided via a lamp or a human/machine interface. Also, a bit in memory is set to a value of one to enter lock out mode. In lock out mode, battery charge protection is not provided nor is power take off. The engine is operated at a base idle speed when the engine is idling. Method 500 proceeds to exit after entering lock out mode.

In this way, a limited number of controller inputs and outputs may be the basis for providing more than one operating mode via the same set of inputs and outputs. In this example, the number of subranges is five, but the number of subranges may be increased or decreased and is not limiting.

Thus, the method of FIG. 5 provides for a method for processing a power take off command, comprising: receiving a signal to a controller; selecting a vehicle operating mode from a plurality of operating modes including a power take off mode and a battery charge protection mode in response to a level of the signal; and adjusting speed of an engine responsive to one of the plurality of operating modes via the controller. The method includes where engine speed is adjusted in via opening a throttle. The method further comprises providing a transfer function relating the signal to a requested vehicle operating mode and adjusting engine speed in response to the requested vehicle operating mode. The method further comprises increasing engine speed in response to the signal increasing and decreasing engine speed in response to the signal decreasing. The method further comprises entering a lock out mode where engine speed is not adjusted responsive to the signal in response to a level of the signal.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware to manipulate operating states of the various devices disclosed. As will be appreciated by one of ordinary skill in the art, the methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A vehicle system, comprising:
a controller including executable instructions stored in non-transitory memory to adjust speed of an engine in response to a signal level applied to an input of the controller, the input having a full scale range, the full scale range divided into a plurality of subranges, the plurality of subranges including a power take off subrange and a battery charge protection subrange.

2. The vehicle system of claim 1, where the signal level is a current level.

3. The vehicle system of claim 1, where the signal level is a voltage level.

4. The vehicle system of claim 1, where the plurality of subranges includes a dead band subrange.

5. The vehicle system of claim 1, where the plurality of subranges includes a low out of scale subrange.

6. The vehicle system of claim 1, where the plurality of subranges includes a high out of scale subrange.

7. The vehicle system of claim 1, further comprising additional instructions for increasing speed of the engine in response to the signal level being in the battery charge protection subrange.

8. The vehicle system of claim 1, further comprising additional instructions for adjusting engine speed to follow the signal level when the signal level is in the power take off subrange.

9. A vehicle system, comprising:
a potentiometer;
first and second resistors electrically coupled in series;
a switch selectively electrically coupled to the potentiometer and the first and second resistors; and
a controller including executable instructions stored in non-transitory memory to adjust speed of an engine in response to a signal level applied to an input of the controller, the input having a full scale range, the input of the controller electrically coupled to the switch.

10. The vehicle system of claim 9, further comprising additional instructions to divide the full scale range into a plurality of subranges, the plurality of subranges including a power take off subrange and a battery charge protection subrange.

11. The vehicle system of claim 9, further comprising additional instructions to determine a vehicle operating mode in response to the signal level applied to the input of the controller.

12. The vehicle system of claim 11, where the vehicle operating mode is a power take off mode.

13. The vehicle system of claim 11, where the vehicle operating mode is a battery charge protection mode.

14. The vehicle system of claim 13, where engine speed is adjusted responsive to a battery voltage in the battery charge protection mode.

15. The vehicle system of claim 9, further comprising additional instructions to activate a relay in response to the signal level applied to the input of the controller, the relay controlling an indication of an operating mode of a vehicle.

16. A method for processing a power take off command, comprising:
receiving a signal to a controller;
selecting a vehicle operating mode from a plurality of operating modes including a power take off mode and a battery charge protection mode in response to a level of the signal; and
adjusting speed of an engine responsive to one of the plurality of operating modes via the controller.

17. The method of claim 16, where engine speed is adjusted in via opening a throttle.

18. The method of claim 16, further comprising providing a transfer function relating the signal to a requested vehicle operating mode and adjusting engine speed in response to the requested vehicle operating mode.

19. The method of claim 16, further comprising increasing engine speed in response to the signal increasing and decreasing engine speed in response to the signal decreasing.

20. The method of claim 18, further comprising entering a lock out mode where engine speed is not adjusted responsive to the signal in response to a level of the signal.

* * * * *